United States Patent [19]

Hinson

[11] Patent Number: 5,927,169
[45] Date of Patent: Jul. 27, 1999

[54] LATHE DRAW TUBE ADAPTOR

[76] Inventor: Ronald L. Hinson, 104 17th La., Piedmont, S.C. 29673

[21] Appl. No.: 08/947,586

[22] Filed: Oct. 9, 1997

Related U.S. Application Data

[60] Provisional application No. 60/028,248, Oct. 9, 1996.

[51] Int. Cl.[6] .............. B23B 25/00; B23B 13/00
[52] U.S. Cl. ................ 82/163; 82/127; 82/142; 82/147; 82/162
[58] Field of Search .............. 82/127, 142, 147, 82/155, 162, 163

[56] References Cited

U.S. PATENT DOCUMENTS

| | | | |
|---|---|---|---|
| 3,890,860 | 6/1975 | Gordon | 82/163 |
| 3,927,585 | 12/1975 | Austin | 82/163 |
| 3,933,062 | 1/1976 | Huber | 82/163 |
| 4,058,036 | 11/1977 | Austin | 82/163 |
| 4,100,827 | 7/1978 | Flemming | 82/163 |
| 4,696,209 | 9/1987 | Felten et al. | 82/147 |
| 4,870,880 | 10/1989 | Cantabery | 82/162 |

*Primary Examiner*—Andrea L. Pitts
*Assistant Examiner*—Toan Le
*Attorney, Agent, or Firm*—Leatherwood Walker Todd & Mann, P.C.

[57] ABSTRACT

A draw tube adaptor for insertion into the draw tube of a lathe. The draw tube adaptor includes a sleeve, and carried within the sleeve are a series of bushings spaced apart from one another. The bushings have bores sized to accommodate the diameter of the stock to be worked, and are maintained in a spaced apart relationship by cylindrical spacers carried within the sleeve. These spacers space the bushings at desired locations throughout the length of the sleeve. A cap arrangement is provided on the sleeve to retain the cylindrical spacers and bushings within the sleeve.

15 Claims, 4 Drawing Sheets

LATHE DRAW TUBE ADAPTOR

This application claims the benefit of U.S. Provisional application Ser. No. 60/028,248, filed Oct. 9, 1996, entitled "Lathe Draw Tube Adaptor."

BACKGROUND OF THE INVENTION

This invention relates generally to a device for use in a draw tube of a lathe for accommodating workstock having diameters less than the internal dimension of the lathe's draw tube.

Lathes used in industrial machine shops typically include what is known as a draw tube or "draw bar". Through this draw tube, which is generally cylindrical, the raw stock to be worked is inserted in a free end of the draw tube. The other end of the draw tube terminates within the lathe adjacent a chuck, which clamps against the raw stock to support the stock as the stock is rotated in the lathe. As the stock is rotated in the lathe, cutting implements, shaping implements, and other tool members are used to provide the desired profile in the stock and for cutting the stock.

Because lathes generally rotate the stock at a relatively high rate of speed, some times approaching several thousand revolutions per minute ("RPM"), it is essential that the stock be securely constrained throughout its length, both for maintaining control of the stock during lathe operations, and also for safety reasons. This stock restraint requirement generally requires the interior diameter of the draw tube to approximate the exterior diameter of the stock being worked. Otherwise, the stock will tend to not only be rotated with the lathe, but can also tend to revolve, or in some cases "orbit" about the free end of the draw tube. This can produce severe production and safety problems.

In order to prevent this from happening, draw tubes having inner diameters substantially matching the raw stock to be worked are available as inserts for the draw tube. Typically, these draw tube inserts provide for an inner diameter which is less than the standard draw tube found on the machine, for allowing smaller diameter stock to be worked. However, such draw tube inserts can be cost-prohibitive when a large variety of smaller diameters of stock are used, because a separate draw tube insert may be required for each smaller diameter stock. Further problems with such an arrangement include the storage requirements for such a large number of inserts and the fact that each insert must be custom-made using special production facilities, which may not allow an insert of a particular inner diameter to be readily produced in a conventional machine shop.

While the foregoing inserts are known, there still exists a need for an economical adaptor usable with a variety of workstock diameters.

SUMMARY OF THE INVENTION

It is, therefore, the principal object of this invention to provide a lathe draw tube adaptor usable on a variety of workstock diameters.

It is another object of the present invention to provide a lathe draw tube adaptor of relatively low production cost.

Another object of the present invention is to provide a lathe draw tube adaptor which can be readily modified for handling a stock of a specific diameter.

Yet another object of the present invention is to provide a lathe draw tube adaptor which can be easily installed in and removed from a conventional lathe.

Generally, the present invention includes a sleeve which is inserted into the draw tube of a lathe. Carried within the sleeve are a series of bushings spaced apart from one another. The bushings are maintained in a spaced apart relationship by cylindrical spacers carried within the sleeve. These spacers space the bushings at desired locations throughout the length of the sleeve. A cap arrangement is provided on the sleeve to retain the cylindrical spacers and bushings within the sleeve.

The inside diameter of the bushings is sized for a particular diameter of bar stock. In order to handle different diameters of bar stock, the same sleeve and cylindrical spacers are used, and bushings having the same outside diameter are used. However, the bushings provided will have an inside diameter sized to handle the bar stock. Preferably, the bushings are made of a material which allows them to be drilled in an ordinary machine shop to provide a desired inner diameter for handling the particular bar stock.

The bushings may be allowed to rotate freely within the sleeve under the influence of the rotating bar stock carried therein, or, alternately, the bushings can be fixed against movement with respect to the rotation of the bar stock.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
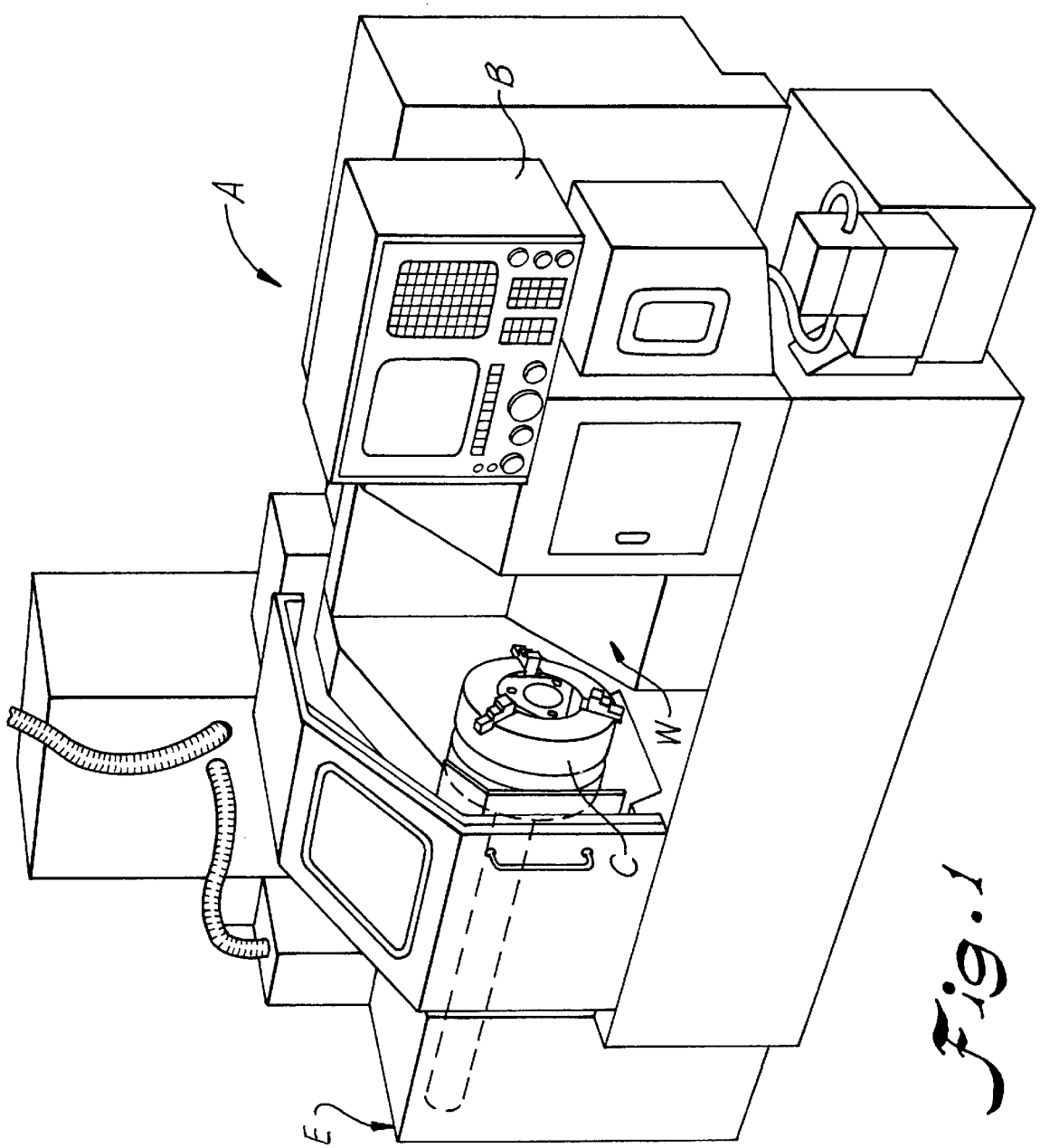
FIG. 1 is a perspective view of a conventional lathe such as a computer numerical control ("CNC") lathe.

The accompanying drawings and the description which follows set forth this invention in its preferred embodiment. However, it is contemplated that persons generally familiar with lathes will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the lathe draw tube adaptor of the present invention is indicated generally in the figures by reference character 10.

Turning to FIG. 1 of the drawings, a conventional lathe A, such as a CNC lathe, is illustrated. Lathe A includes an operator interface, generally B, and a chuck, generally C. Lathe A also includes a tool cutting and working area, generally W. Lathe A includes a raw stock entry end, generally E. Lathe A further includes a draw tube D shown in phantom. Generally, raw stock S is inserted into end E of lathe A and passes through draw tube D, and into chuck C, which grips the stock during rotation of the lathe and working of the stock with a lathe tool T.

Figure 2:
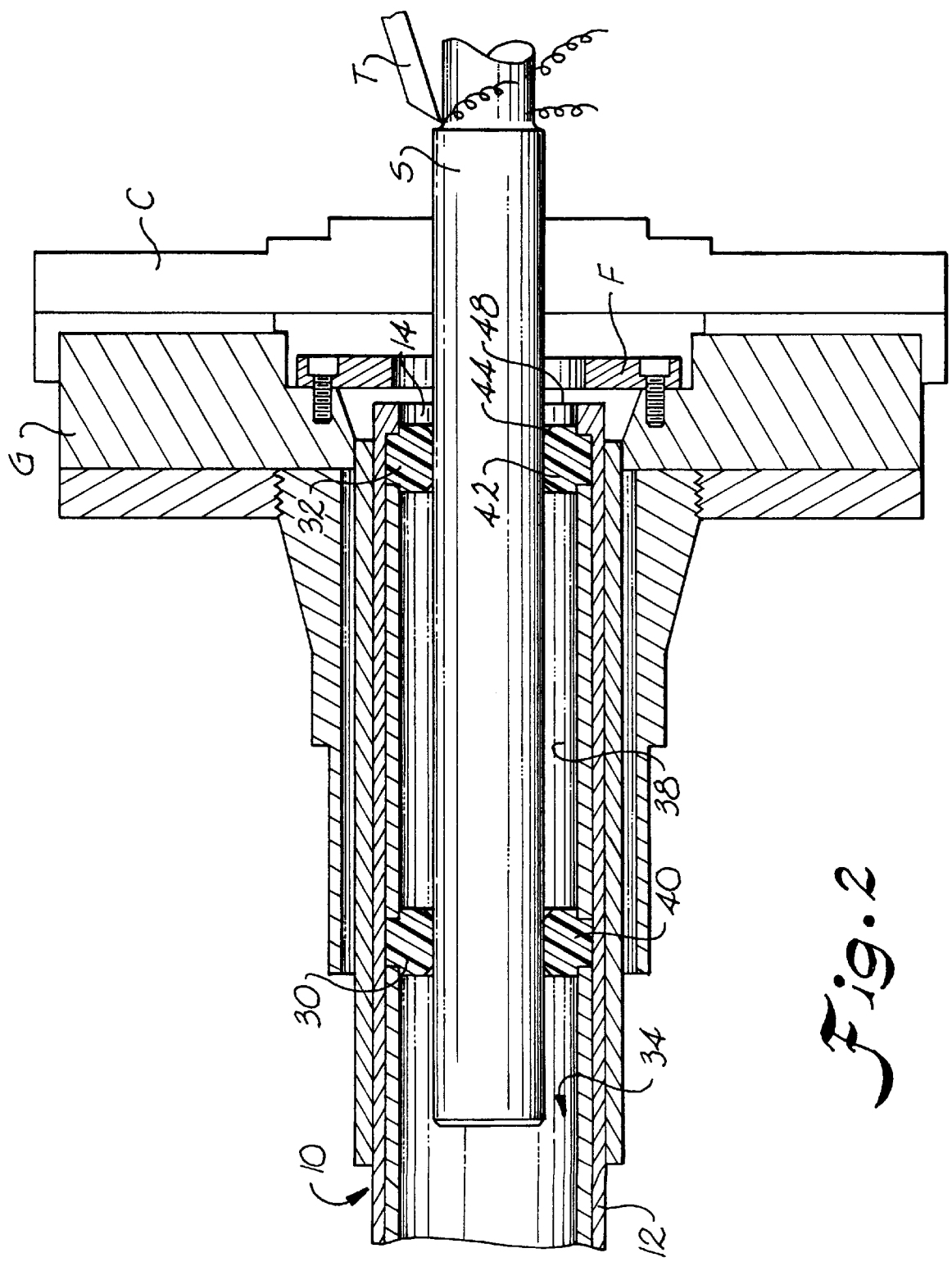
FIG. 2 is a sectional view of a lathe draw tube adaptor installed in a draw tube of a lathe.
Figure 3:
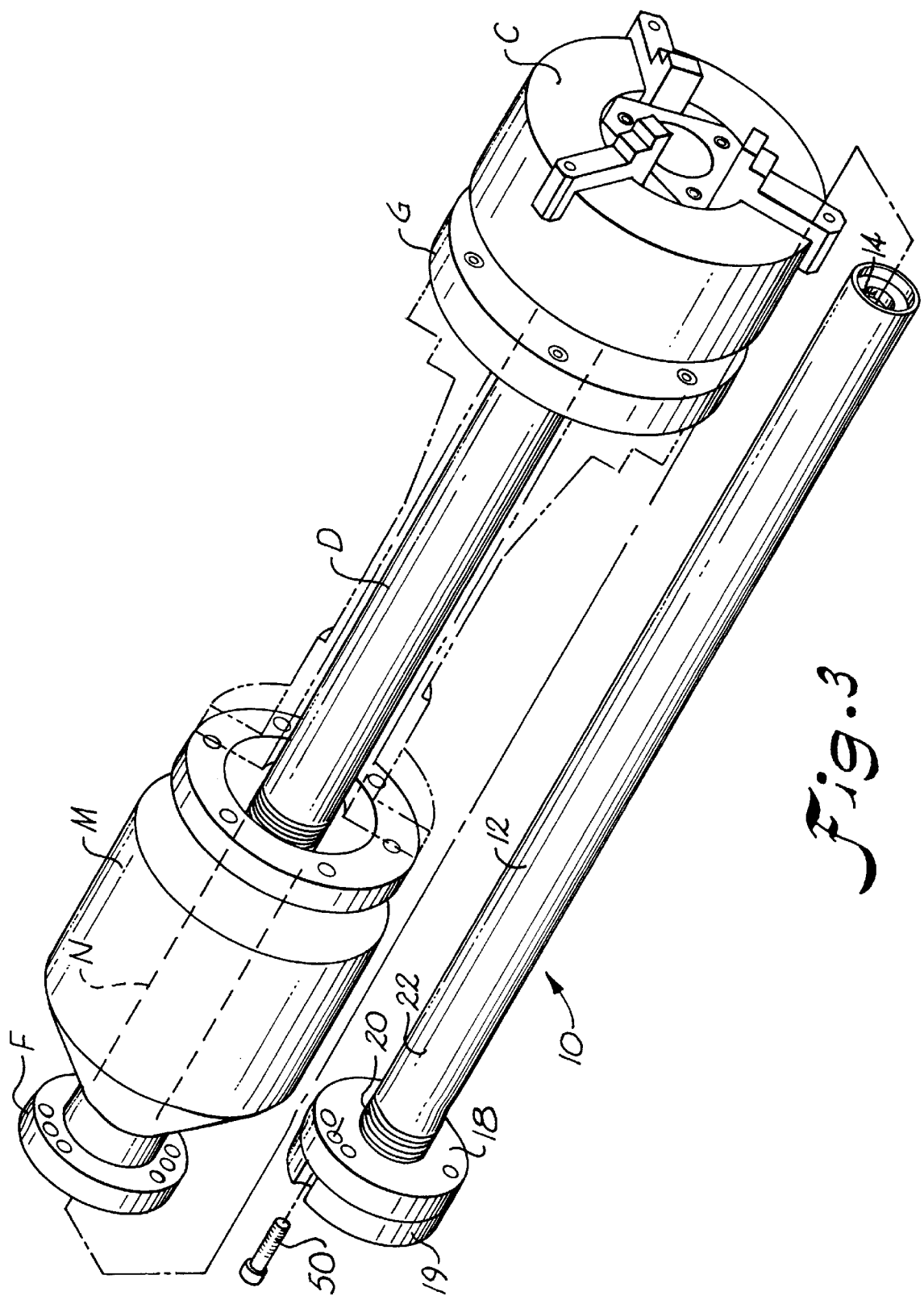
FIG. 3 is a perspective view of a lathe draw tube adaptor constructed in accordance with the present invention prior to installation within a draw tube of a lathe.

FIG. 2 illustrates lathe draw tube adaptor 10 installed within a conventional draw tube D. Draw tube adaptor 10 includes an outer sleeve 12 which at one end terminates with a circumferential shoulder 14 within the interior of sleeve 12, and which at its other end terminates in a flange 18 which is threadingly attached to sleeve 12 via welding and/or threads 20 provided on the circumference of the entry end 22 of sleeve 12. A ring-shaped cap 19 is secured to a flange 18, which in turn is secured to a flange F provided on, or adjacent to, the motor M of the lathe. Cap 19 has a plurality of holes 21 to allow it to be bolted to different models of lathes and flanges F. Motor M has a hollow drive shaft, or spindle, N.

Bushing members, generally 28, include a bushing 32, which is illustrated in FIG. 2 adjacent shoulder 14. Interposed between bushings 28 are cylindrical spacers, generally 34. Specifically, interposed between bushings 30 and 32 is cylindrical spacer number 38. Bushings 28 may be provided with reduced peripheral portions 40 for receiving the circumferential end portions of spacers 34. Bushings 28 are also preferably provided with chamfered portions 42, 44 for facilitating insertion and removal of raw stock, generally S, therethrough.

Draw tube adaptor 10 is inserted into draw tube D of lathe A such that end 48 of adaptor 10 terminates adjacent a mounting flange, generally F, in a ring G of chuck C as shown in FIG. 2.

Figure 4:
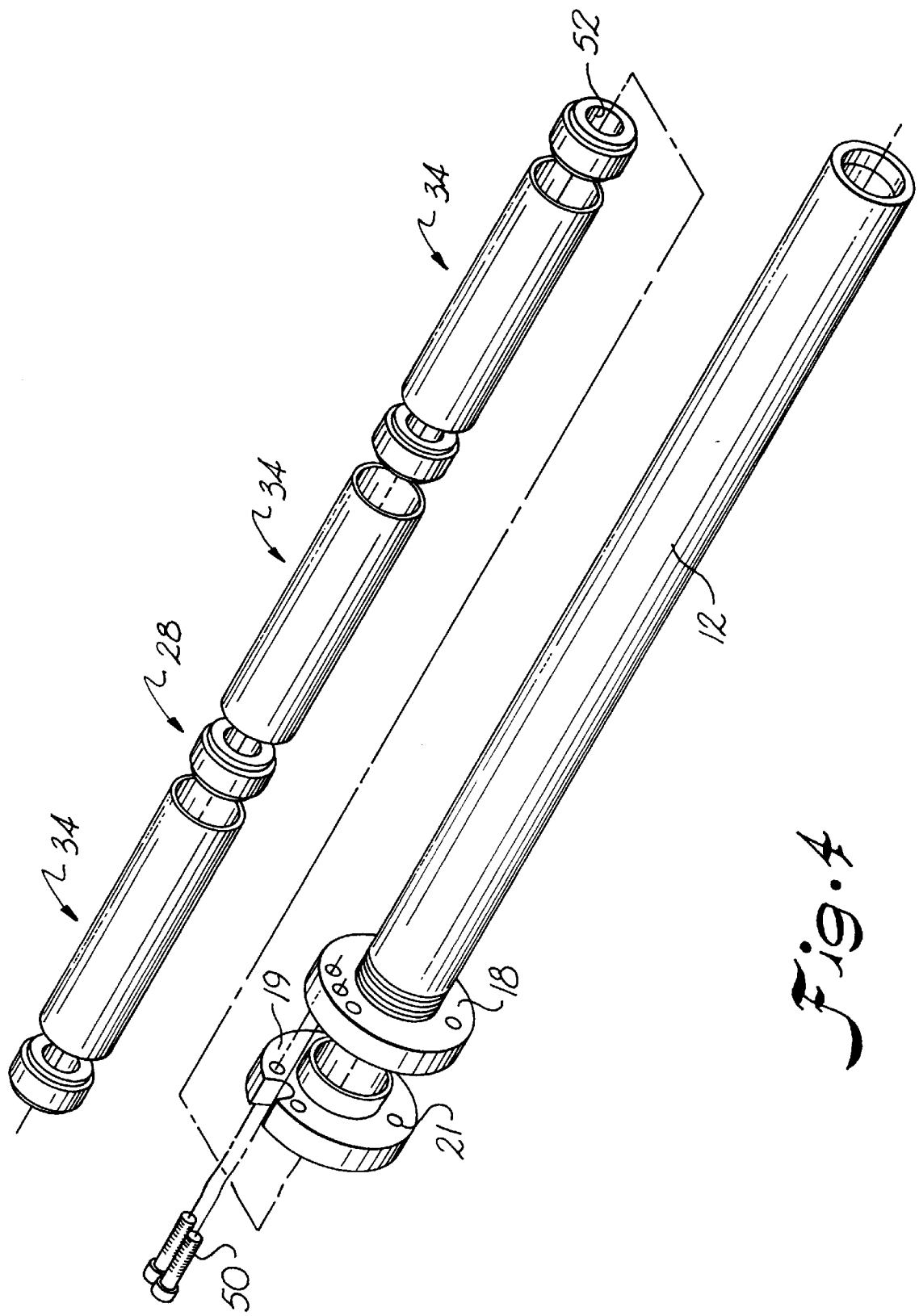
FIG. 4 is an exploded view of a lathe draw tube adaptor constructed in accordance with the present invention prior to installation within a draw tube of a lathe.

FIG. 4 illustrates the internal assembly and arrangement of draw tube adaptor 10. As shown, four bushings 28 are provided for insertion into draw tube sleeve 12. However, it is to be understood that a greater or lesser number of bushings 28 could be used, as desired. Interposed between bushings 28, are three spacers 34. Once inserted into sleeve 12, cap plate 19 is bolted to a flange number 18. Adaptor tube 10, once assembled, is bolted to the motor flange F of lathe A with bolts 50.

Sleeve 12 is preferably constructed of a light-weight, durable material, such as aluminum or steel, and spacers 34 likewise can be constructed of aluminum or steel or some other suitable material. Bushings 28 are preferably constructed of nylon; however, bushings 28 could be constructed of metal, wood, plastic, or any other suitable material. Further, sleeve 12 and spacers 34 could be constructed or molded from plastic, if desired.

During operation, spacers 34 are selected having an inner diameter 52 substantially matching, or slightly larger than, the outer diameter of the raw stock S to be worked. If the diameter of a spacer 34 is too small to handle the outer diameter of the raw stock, the spacer 34 can readily be drilled or bored to the correct diameter. If, on the other hand, the diameter of the available spacers 34 is too large, additional spacers 34 can be obtained at a relatively inexpensive cost and drilled to fit the stock's outside diameter. Once the spacers 34 having the correct inner diameter 52 are provided, they are inserted alternatingly with cylindrical spacers 34 within sleeve 12. Once the assembly is complete, cap plate 19 is bolted to flange 18 and flange F. Once this is done, the stock S is inserted through cap 19 and through spacers 34 into chuck C, where it is gripped for rotation when the lathe is operated.

Removal of draw tube adaptor 10 is done in the reverse manner as was installation.

From the foregoing, it can be seen that the lathe draw tube adaptor 10 of the present invention provides a relatively economical and multi-use means with wide application for use with a lathe on raw stock of various diameters. Draw tube adaptor 10, through the containment of raw stock S within bushings 28, allows for such smaller raw stock S to be worked by lathe A, and also potentially improves safety of operation of lathe A when smaller stock S is used.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure.

What is claimed is:

1. An adaptor for insertion into the draw tube of a lathe for supporting stock to be worked by the lathe, the adaptor comprising:

an elongated sleeve defining a generally cylindrical elongated passage therein;

a plurality of bushings carried for rotation relative to said sleeve in said passage of said sleeve, each of said bushings defining a bore therein for receiving the stock to be worked; and at least one elongated spacer carried in said passage of said sleeve adjacent to and between said plurality of bushings, said spacer serving to maintain said bushings at a predetermined distance from one another.

2. An adaptor as defined in claim 1, wherein said sleeve is cylindrical.

3. An adaptor as defined in claim 1, wherein said sleeve is fixedly connected to the draw tube.

4. An adaptor as defined in claim 1, wherein said spacer is a generally cylindrical sleeve.

5. An adaptor as defined in claim 2, wherein said elongated passage is cylindrical and said spacer is cylindrical, said elongated passage having a diameter approximately the same as the outer diameter of said spacer.

6. An adaptor as defined in claim 2, wherein said bushings are generally cylindrical.

7. An adaptor as defined in claim 5, wherein said bushings are generally cylindrical and have an outer diameter approximately the same as the diameter of said elongated passage.

8. An adaptor as defined in claim 1, wherein said bore in each of said bushings is approximately the same dimension as the outer dimension of the stock to be worked.

9. An adaptor as defined in claim 1, wherein said sleeve has a first end and a second end opposite said first end; and further comprising a terminal bushing adjacent said first end of said sleeve, and said first end of said sleeve including a shoulder for abutting and retaining said terminal bushing in said sleeve.

10. An adaptor as defined in claim 1, wherein said sleeve has a first end and a second end opposite said first end; and further comprising said second end of said sleeve having a cap for retaining said spacer and said bushings in said sleeve.

11. An adaptor as defined in claim 10, further comprising a flange connected to said cap adapted for attaching said sleeve to the draw tube.

12. An adaptor as defined in claim 1, wherein said bushings are constructed of plastic.

13. An adaptor for insertion into the draw tube of a lathe for supporting stock to be worked by the lathe, the adaptor comprising:

an elongated cylindrical sleeve defining a cylindrical passage therein;

a plurality of generally cylindrical bushings carried for rotation relative to said sleeve in said cylindrical passage of said sleeve, each of said bushings defining a bore therein for receiving the stock to be worked; and at least one cylindrical spacer carried in said cylindrical passage of said sleeve adjacent to and between said plurality of bushings, said spacer serving to maintain said bushings at a predetermined distance from one another.

14. An adaptor as defined in claim 13, wherein said sleeve has a first end and a second end opposite said first end; and further comprising said first end of said sleeve having retention means for retaining said bushings and said spacer in said sleeve.

15. An adaptor as defined in claim 13, wherein said sleeve has a first end and a second end opposite said first end; and further comprising said second end of said sleeve having a cap for retaining said spacer and said bushings in said sleeve.

* * * * *